United States Patent [19]
Goodwin et al.

[11] Patent Number: 5,818,975
[45] Date of Patent: Oct. 6, 1998

[54] METHOD AND APPARATUS FOR AREA SELECTIVE EXPOSURE ADJUSTMENT

[75] Inventors: Robert M. Goodwin; Andrew Gallagher, both of Rochester, N.Y.

[73] Assignee: Eastman Kodak Company, Rochester, N.Y.

[21] Appl. No.: 736,840

[22] Filed: Oct. 28, 1996

[51] Int. Cl.⁶ .................................................. G06T 05/50
[52] U.S. Cl. .......................................... 382/274; 345/432
[58] Field of Search ..................... 345/432, 442, 345/430, 431, 147; 382/274, 167, 264, 171, 172, 173, 269, 270

[56] References Cited

U.S. PATENT DOCUMENTS

| | | | |
|---|---|---|---|
| 4,933,754 | 6/1990 | Reed et al. | 358/76 |
| 4,945,406 | 7/1990 | Cok | 358/80 |
| 5,012,333 | 4/1991 | Lee | 358/80 |
| 5,023,652 | 6/1991 | Purro | 355/1 |
| 5,070,358 | 12/1991 | Stouffer et al. | 355/20 |
| 5,170,443 | 12/1992 | Todd | 382/274 |
| 5,218,350 | 6/1993 | Bollman | 340/723 |
| 5,294,989 | 3/1994 | Moore et al. | 348/241 |
| 5,724,456 | 3/1998 | Boyack et al. | 382/274 |

*Primary Examiner*—Mark K. Zimmerman
*Assistant Examiner*—Huedung X. Cao
*Attorney, Agent, or Firm*—Thomas H. Close

[57] ABSTRACT

A digital image having a dynamic range representing a brightness in an original scene greater than the dynamic range of an output medium, is processed to fit the dynamic range of the output medium by dividing the image into first and second portions, the first portion of the image representing a brightness range extending from a minimum brightness up to a distance equal to the dynamic range of the output medium, the second portion of the image representing a brightness range extending from a maximum brightness down to a distance equal to the dynamic range of the output medium. First and second transformations are determined for the first and second portions of the image respectively that map the first and second portions onto the dynamic range of the output medium using a exposure determination algorithm of the type used in photographic printers. The digital image is then thresholded at a brightness level that divides the image into a first region having the lowest levels of brightness and a second region having the highest levels of brightness. Finally, the first transformation is applied to the first region of the image and the second transformation is applied to the second region of the image to produce a digital image having a dynamic range that matches the dynamic range of the output medium while maintaining natural contrast within objects in the image.

17 Claims, 11 Drawing Sheets

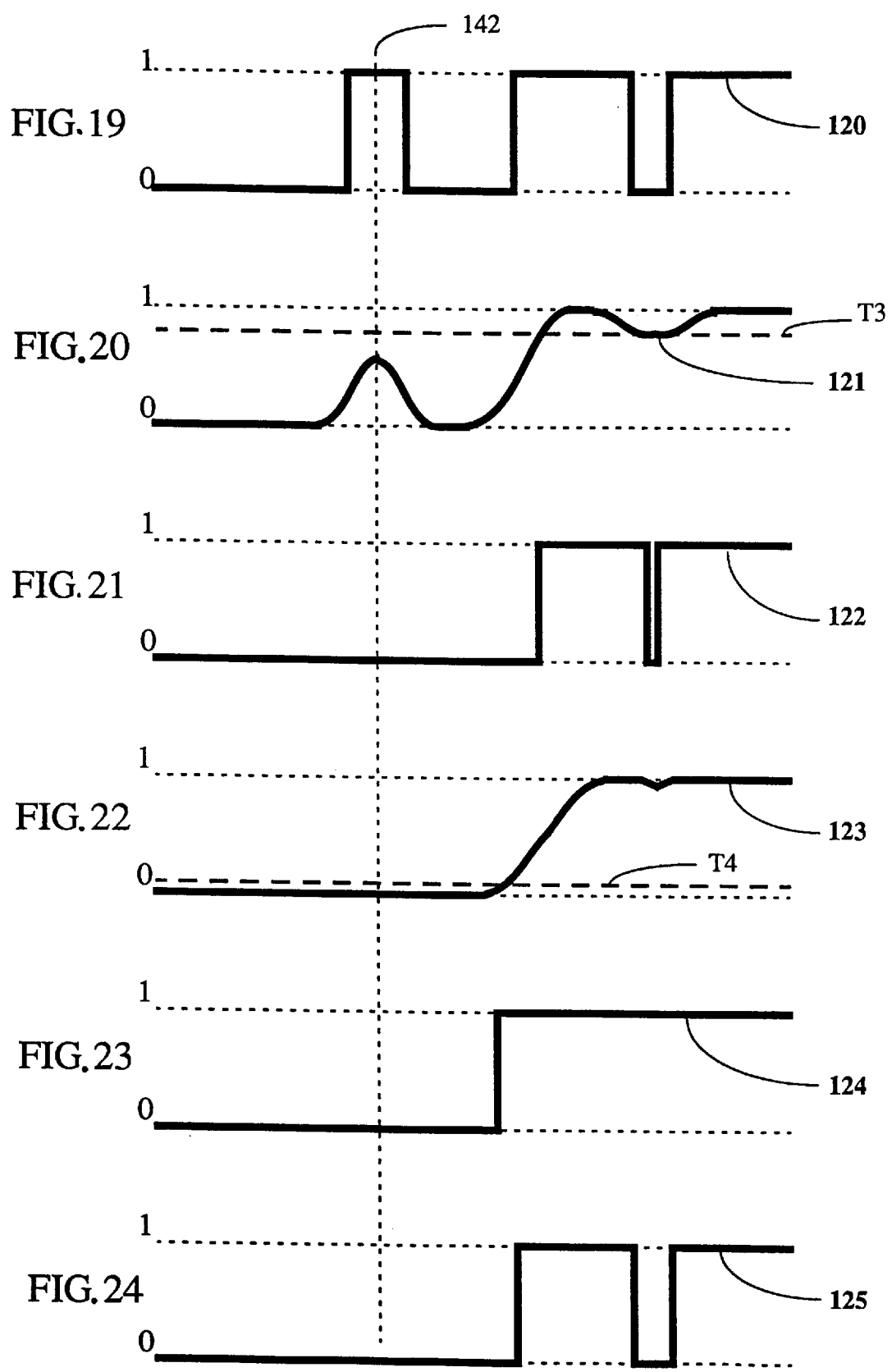

METHOD AND APPARATUS FOR AREA SELECTIVE EXPOSURE ADJUSTMENT

FIELD OF THE INVENTION

The invention relates generally to the field of digital image processing, and in particular to area selective exposure adjustment, a technique related to dodging and burning in conventional photographic printing.

BACKGROUND OF THE INVENTION

The dynamic range of images captured on one medium (such as negative film) may exceed the dynamic range of the medium that the image is rendered on (such as photographic paper). This results in a loss of image detail in the rendered image. The detail may be lost in the highlight portion of the image (such as when a backlit image is printed light enough to properly render the shadow detail, but rendered too light to show the highlight detail such as the clouds in the sky). Or the detail may be lost in the shadow portion of the image (such as when a "flash-in-the-face" image is rendered properly for the subject of the picture, but the background is rendered too dark to show the detail in the background). In conventional photographic printing techniques, these problems are addressed by the process of "dodging" or "burning", i.e. subtracting exposure from selected shadow areas of the image (dodging), or adding exposure to selected highlight areas of the image (burning).

With the advent of digital image processing, it was possible to easily rescale the any image data so that it fits and fills the dynamic range of the output medium, such as a photographic print. However this type of image data modification often produces undesirable alterations in the visual contrast within objects reproduced by the output medium. This is especially true when the dynamic range of the image on the capture medium exceeds the dynamic range of the output medium when the captured image is reproduced at a natural or preferred contrast, and the rescaling operation then reduces the contrast within the reproduced objects by an undesirable amount. In such a case, capability for selectively controlling exposure in certain areas of the image, similar to the burning and dodging capability in conventional photographic printing, is desirable. For example, U.S. Pat. No. 5,218,350 to Bollman discloses a digital image processing method for dodging defined areas of an image using a soft edged mask for the areas to be dodged. The areas to be dodged are defined either manually or by edge finding software or other selection techniques and are encoded as a bit map control plane. The edges of the bit map control plane are blurred which produces unallowed intermediate control values between zero and one. A quantization function is applied to the intermediate control values to restore them to allowed bit map values. The blurred bit map is then used to control the appearance characteristics of the final image.

One problem with this approach is that the known methods of defining the areas to be processed are very labor intensive, requiring excessive operator interaction with the image processing apparatus. Another shortcoming is that the process of applying the quantization function to the intermediate control values results in a loss of spatial resolution in the bit map control plane thereby performing exposure adjustments in unintended areas.

There is a need therefor for an improved method of digital image processing for performing Area Selective Exposure Adjustment (ASEA).

SUMMARY OF THE INVENTION

The present invention is directed to overcoming one or more of the problems set forth above. Briefly summarized, according to one aspect of the present invention, a digital image having a dynamic range representing a brightness in an original scene greater than the dynamic range of an output medium, is processed to fit the dynamic range of the output medium by dividing the image into first and second portions, the first portion of the image representing a brightness range extending from a minimum brightness up to a distance equal to the dynamic range of the output medium, the second portion of the image representing a brightness range extending from a maximum brightness down to a distance equal to the dynamic range of the output medium.

First and second transformations are determined for the first and second portions of the image respectively that map the first and second portions onto the dynamic range of the output medium using a exposure determination algorithm of the type used in photographic printers. The digital image is then thresholded at a brightness level that divides the image into a first region having the lowest levels of brightness and a second region having the highest levels of brightness. Finally, the first transformation is applied to the first region of the image and the second transformation is applied to the second region of the image to produce a processed digital image.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention is advantageous in that it produces a processed digital image that has a dynamic range that matches the dynamic range of the output medium while maintaining natural contrast within objects in the image.

BRIEF DESCRIPTION OF THE DRAWINGS

FIGS. 19–24 are diagrams useful in describing the steps of a second method of the mask modification process according to the present invention;

DETAILED DESCRIPTION OF THE INVENTION

Figure 1:
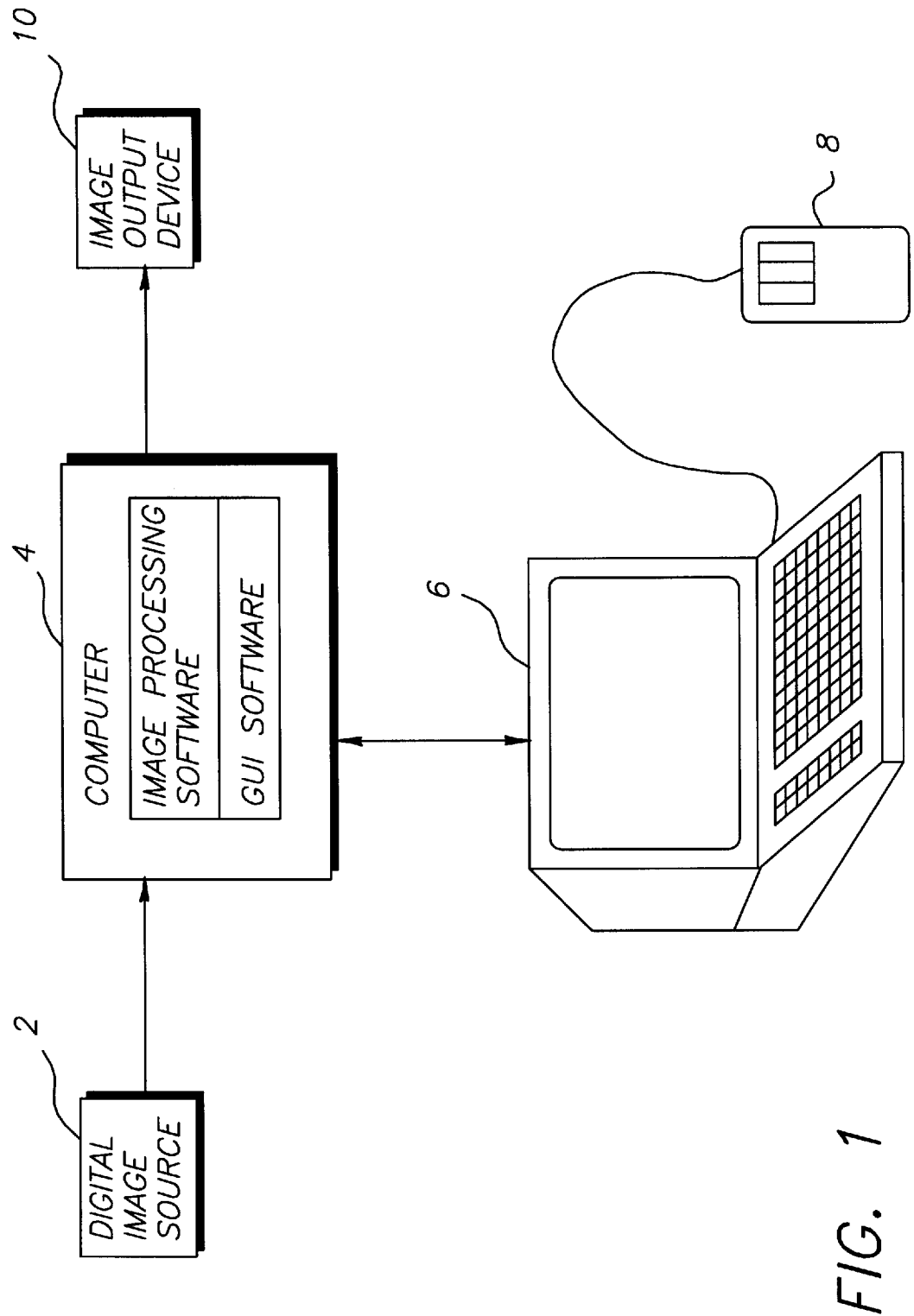
FIG. 1 is a diagram of the essential components of an image processing system used to apply the method of Area Selective Exposure Adjustment according to the present invention.

The invention may be practiced using the digital image processing apparatus illustrated in FIG. 1. The digital image processing apparatus includes a digital image source 2 which may be a digital camera or a photographic image scanner, such as a Photo CD scanner, a computer 4 running image processing software controlled by an operator using a graphical user interface (GUI), a computer terminal with a monitor and keyboard 6, and mouse or other control device 8, and an image output device 10 such as a video display or hardcopy printer such as a laser printer or a thermal printer.

Figure 2:
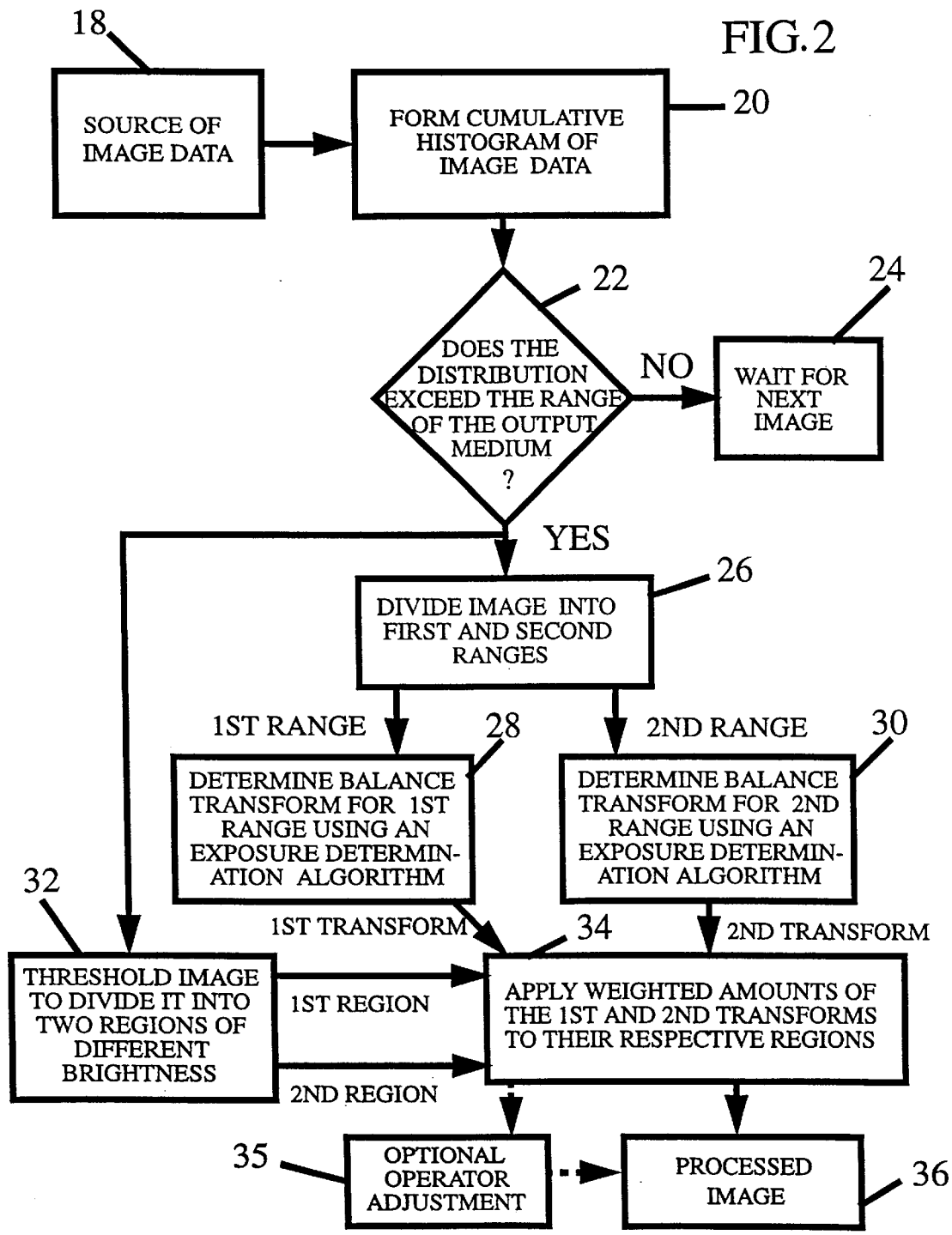
FIG. 2 is a flow chart showing the essential steps of the method of Area Selective Exposure Adjustment according to the present invention.

FIG. 2 is a flow chart showing the essential steps of the method of the invention. As image data 18 is accessed, the first step is to form a cumulative histogram from the data 20. The histogram is used to determine the image data's effective range, and that range is compared to the dynamic range of the output medium 22. For instance, photographic paper used in the negative/positive system will render the reflectances of most naturally occurring objects with a pleasing or natural contrast if they all received above the same level of illumination at the time they were photographed. This implies a range of densities which will render properly, thus any negative containing a larger range of densities is a candidate for Area Selective Exposure Adjustment (ASEA). However, if the image data fits on the dynamic range of the output medium then ASEA is not required, and the processing method awaits the next image 24.

Figure 3:
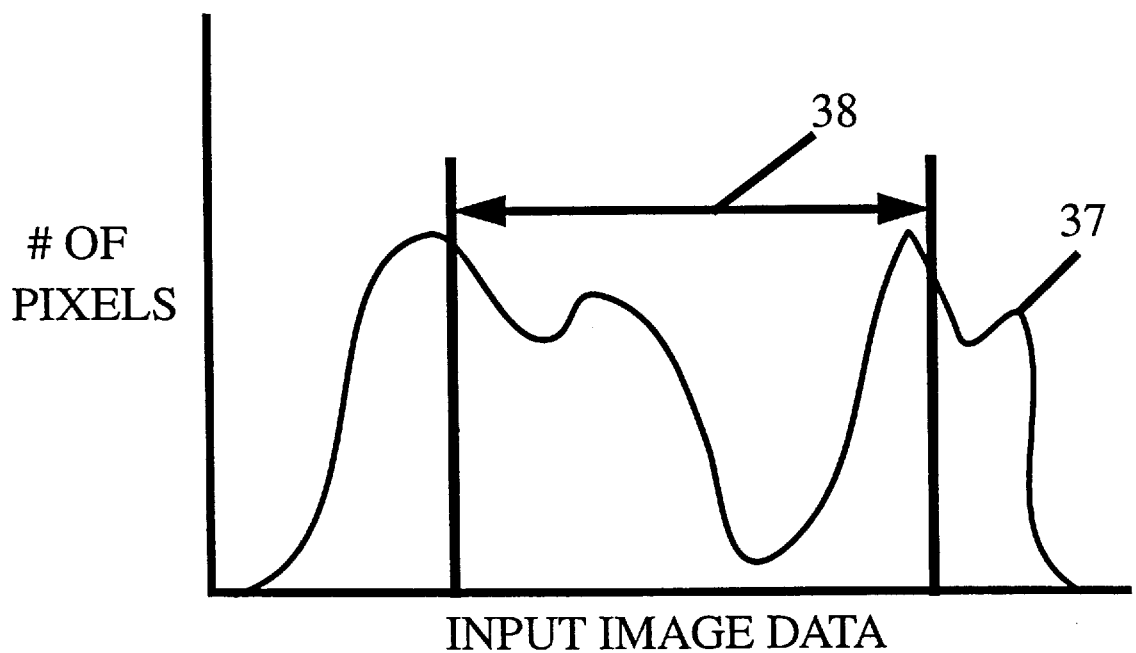
FIG. 3 is a histogram of an image requiring processing according to the present invention.

FIG. 3 illustrates a histogram of image data that is a candidate for ASEA.

Figure 4:
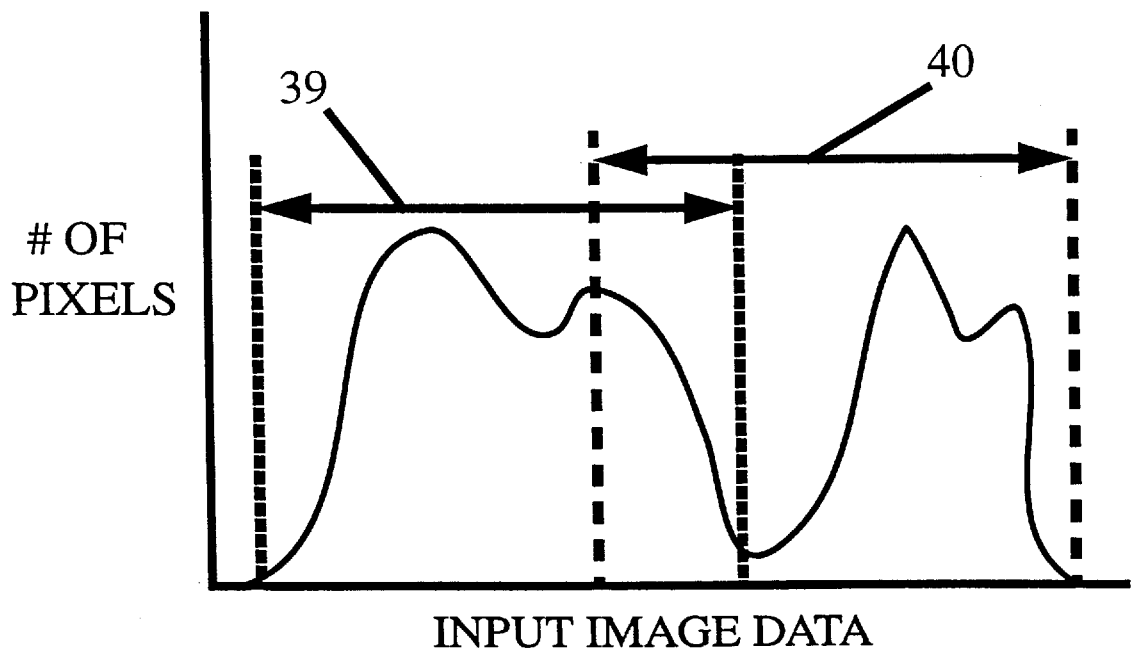
FIG. 4 is a histogram of an image showing how it is divided into two ranges each of which will fit on the dynamic range of the output medium.

It shows a histogram of input image data 37 that exceeds the range of the output medium 38. FIG. 4 shows how the image data is divided into two ranges in step 26 each of which will fit on the dynamic range of the output medium. The first range of image data 39 extends from a low percentage point (such as the 1% point) on the cumulative histogram, up to a value which defines a range that will fit on the dynamic range of the output medium. The second range 40 extends from a high percentage point (such as the 99% point) on the cumulative histogram down to a value which defines a range that will fit on the dynamic range of the output medium. Normally these two ranges will overlap to some extent. However, if the range of the image data were so large that it exceeded the dynamic range of the output medium by more than a factor of two, then it would be divided into three or more ranges. However, the explanation will continue assuming that two ranges are sufficient.

Figure 5:
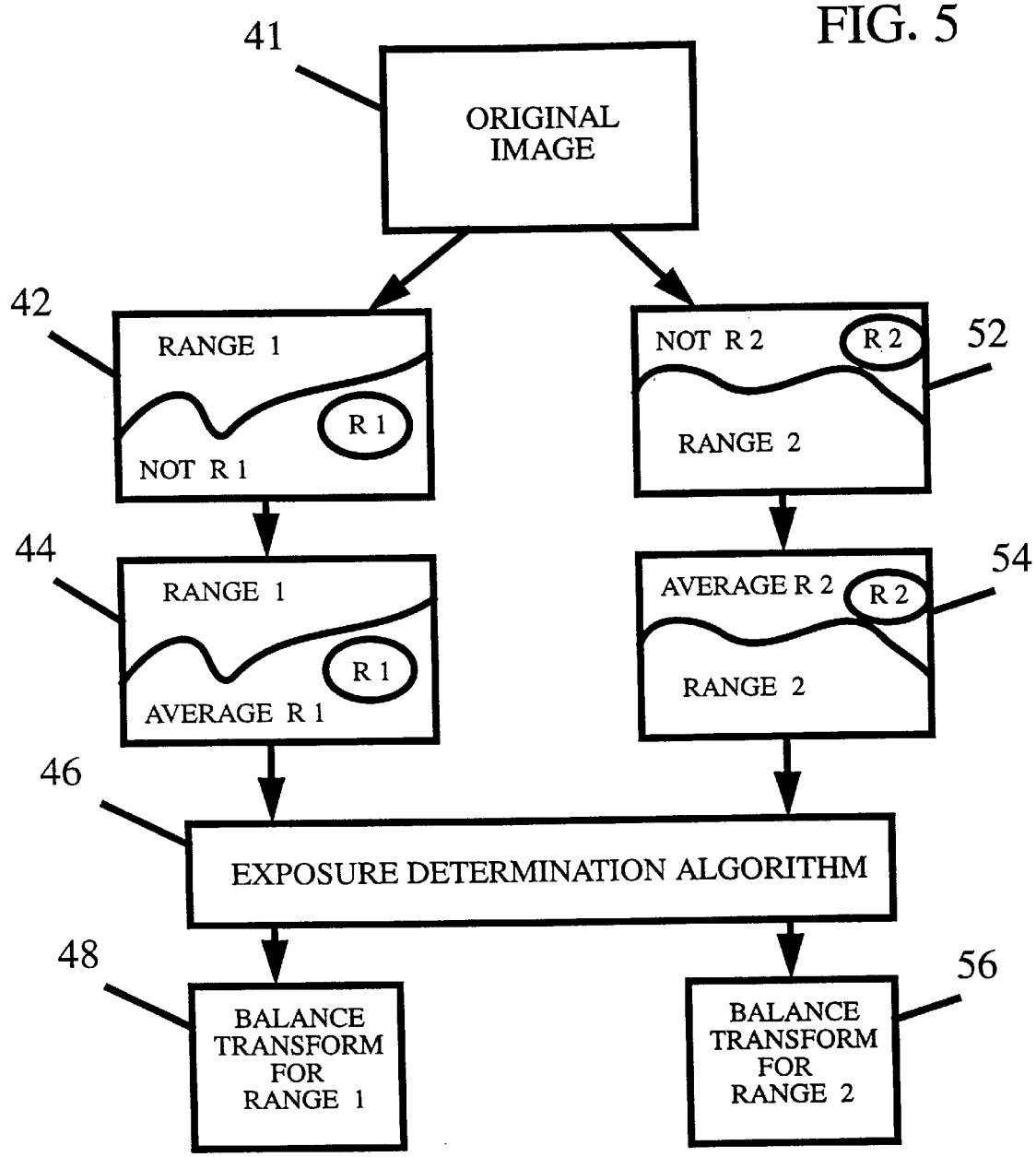
FIG. 5 is a flow chart showing one method of using an exposure determination algorithm to determine the balance transform for each range of image data according to the present invention.

Returning to FIG. 2, the balance for the first range of image data representing primarily the shadow or lower light level detail is determined in 28 and the balance for the second range of image data representing primarily the highlight or higher light level detail is determined in 30 by a set of similar operations. As used herein, the term "balance" refers to the lightness and color of the output image. Conventionally, the exposure determination algorithms in photographic printing processes have been referred to as color and density balance algorithms. The present invention employs conventional color and density balance algorithms for performing steps 28 and 30. For a further explanation of steps 26 through 30 in FIG. 2 refer to FIG. 5. Two copies of the original image data 41 are used. In step 42 the pixels in the first copy which are in the first range are left unchanged while the pixels in those portions of the image which are outside of the first range, NOT R1 in step 42, are replaced (pixel by pixel) with the average of the image data in the first range. This amended image data 44 is then sent to an automatic exposure determination algorithm 46 (such as are used in high speed optical printers or in a Photo CD scanner, see for example U.S. Pat. No. 4,945,406) to calculate the proper balance transform 48 for the first range of the image data.

Symmetrically in step 52 the pixels in those portions of the second copy of the image which are outside of the second range, NOT R2 in 52, are replaced (pixel by pixel) by the average of the image data in the second range. This amended image data 54 is also sent to the automatic exposure determination algorithm 46 to calculate the proper balance transform 56 for the second range of the image data.

Figure 6:
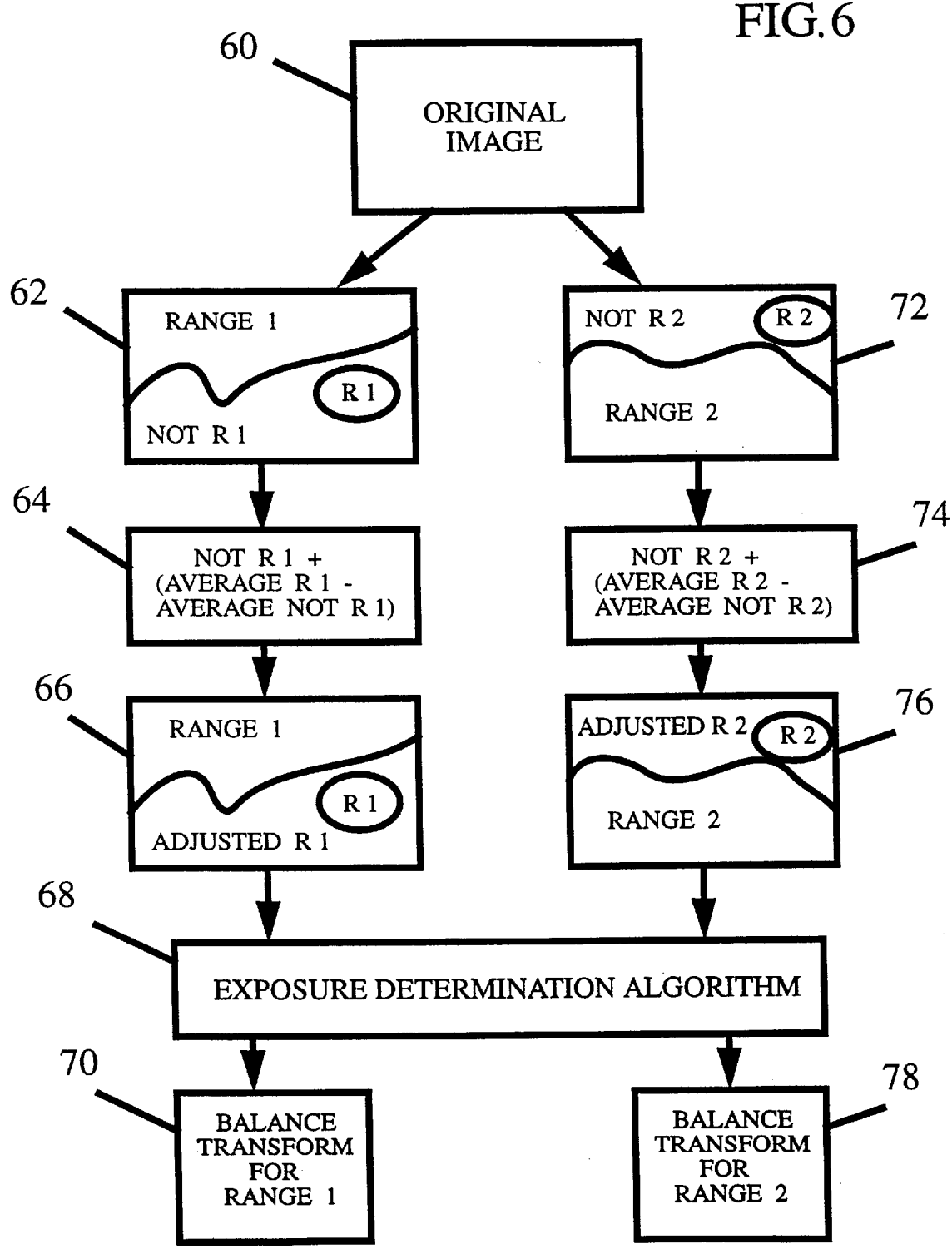
FIG. 6 is a flow chart showing a second method of using an exposure determination algorithm to determine the balance transform for each range of image data according to the present invention.

FIG. 6 illustrates an alternative method to accomplish steps 26 through 30 in FIG. 2. Again two copies of the original image data 60 are used. In step 62 the pixels in the first copy which are in the first range are left unchanged while the pixels in those portions of the image which are outside of the first range, NOT R1 in 62, are replaced (pixel by pixel) by adding the difference between the average value of the pixels in the first range and the average value of the pixels outside the first range (IN–OUT) to the pixels outside the first range 64. This amended image data 66 is then sent to an automatic exposure determination algorithm 68 (such as are used in high speed optical printers or in a Photo CD scanner, see for example U.S. Pat. No. 4,945,406) to calculate the proper balance transform 70 for the first range of the image data.

Symmetrically in 72 the pixels in those portions of the second copy of the image which are outside of the second range, NOT R2 in 72, are replaced (pixel by pixel) by adding the difference between the average value of the pixels in the second range and the average value of the pixels outside the second range (IN–OUT) to the pixels outside the second range 74. This amended image data 76 is also sent to the automatic exposure determination algorithm 68 to calculate the proper balance transform 78 for the second range of the image data.

Returning to FIG. 2, once the proper balance transforms are determined in 28 and 30, the original image data is divided into two non-overlapping regions which correlate with the different brightness levels in the original scene. These non-overlapping regions are spatial regions in the image, in distinction to the ranges of brightness in the image histogram that were discussed above. The image is divided into the two regions in step 32 by generating a mask which defines the two regions.

Figure 7:
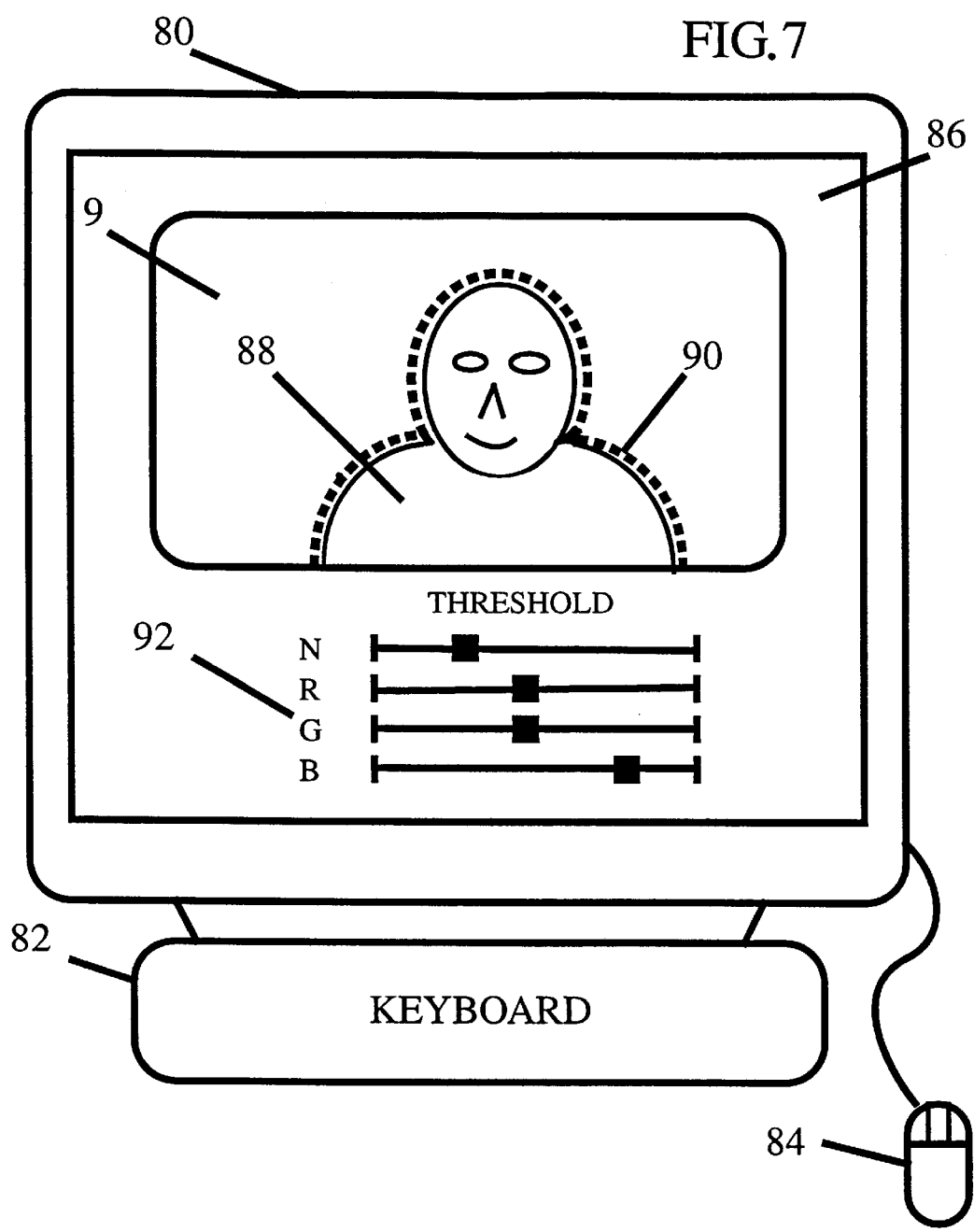
FIG. 7 is a diagram of the essential components of a computer terminal and GUI interface useful for practicing the present invention.

Alternatively, if there is a gradient of brightness levels, then the mask may be generated so that it correlates with the brightness gradient. This may be done using one or more of the techniques described below in which the mask generation step is guided by an operator who in the preferred embodiment is working at a computer workstation 80, such as those manufactured and sold by SUN Microcomputer Systems, illustrated in FIG. 7. The workstation 80 includes a keyboard 82, a mouse or other control device 84, and a video monitor 86 displaying both the image 88 and the location of the currently defined mask 90 as well as a GUI 92 having sliders for adjusting common mode (N), red (R), green (G), and blue (B) threshold values which define the location of the mask 90.

Initially the mask 90 is defined by the threshold values for the image data.

These thresholds are adjusted by the operator using the sliders in the GUI 92 to define the region of the image which corresponds to the brightest region in the scene (i.e. the "highlight" mask). The thresholds may be adjusted for all three colors simultaneously, or for just one color at a time. In the preferred embodiment, visual feedback is provided to the operator by showing the highlight region boundary 90 defined by the current RGB thresholds on a video display 86. The highlight mask is encoded by an overlay image defined by the region of the image which lies inside boundary 90 and which in the preferred embodiment has a value 1 in this highlight region. By definition, those elements not in the highlight mask are in the other "shadow" mask 91 whose location outside the boundary 90 is encoded by 0's in the overlay image.

Figures 8, 11:
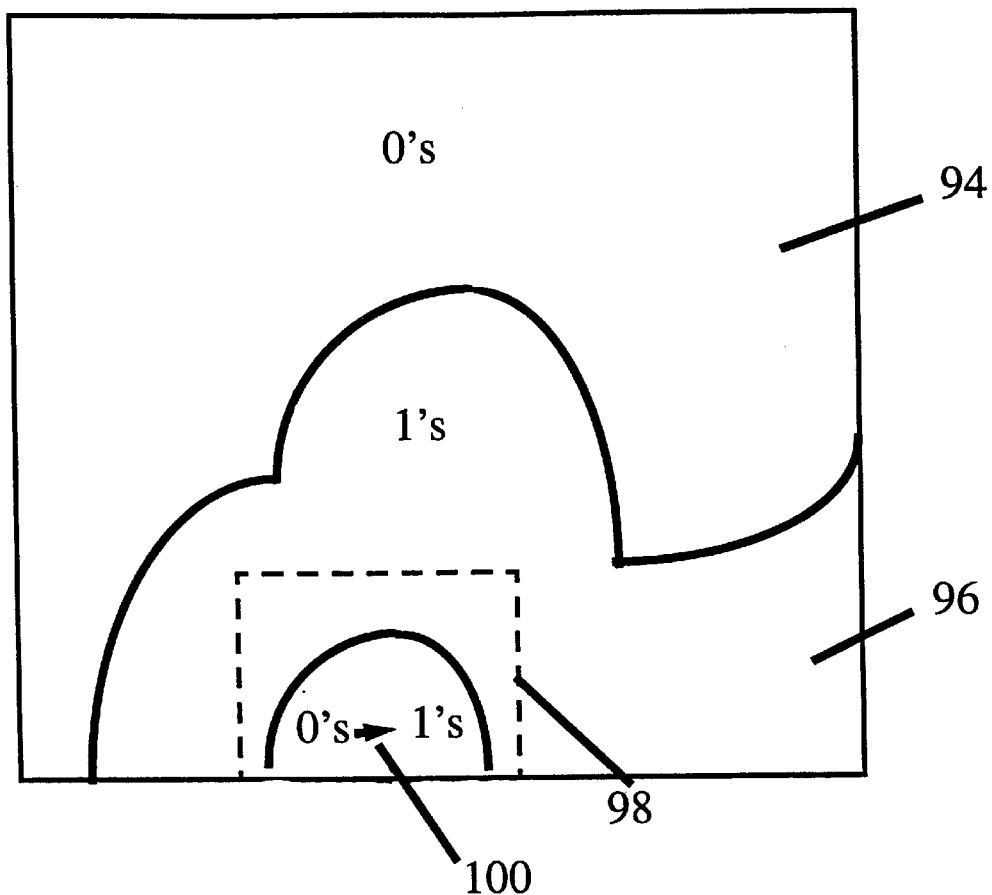
FIG. 8 is a diagram showing the method of correcting a brightness range mask using an operator defined rectangular area.
FIG. 11 is a table showing the filter kernel values useful for finding edges required for the mask modification process according to the present invention.

This encoding is illustrated in FIG. 8 for another example. The shadow region 94 is encoded by 0's while the highlight region 96 is encoded by 1's However, because some of the low reflectance objects in the high illumination region may have the same image values as high reflectance objects in the low illumination region ("confounding" reflectances), it may not be possible to make a perfect selection of the highlight region using thresholds alone, as illustrated by region 100 in FIG. 8. In this case, additional operations are necessary to define the highlight region.

One additional operation is to use a standard GUI interface (click-pull-click) to define one or more rectangular "override" mask regions which are to be either in the highlight mask or in the shadow mask irrespective of the threshold being used.

This is illustrated in FIG. 8 by the dashed line defining area 98 in the highlight mask 96 in which the 0's are to be forced to be 1's. This can be very effective for relatively large areas with confounding reflectances contained entirely within an area of the image which was exposed with a single (or restricted range) of illumination.

Figure 9:
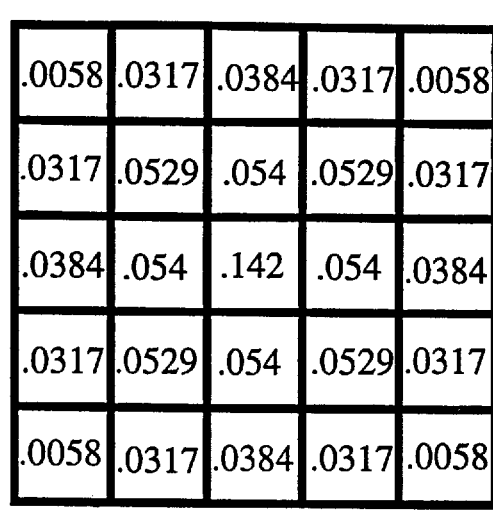
FIG. 9 is a table showing the FIR filter kernel values useful in the blurring step of the present invention.

Another additional operation is to blur the mask 96 with a symmetric finite impulse response (FIR) filter (i.e. blur the overlay image). FIG. 9 shows an array 101 of numbers which are the kernel values for a preferred 5×5 blurring filter which has a bandpass of about one quarter the sampling frequency. The mask 96 (see FIG. 8) may be blurred by larger amounts by repeatedly subsampling it by a factor of two and filtering again using the filter array 101. When a satisfactory level of blur is reached, as determined by the operator, the mask 96 is resampled back up to its original size using linear interpolation. Those skilled in digital filtering will recognize that FIR filters of other sizes and designs may be used equally well to accomplish this blur, subsample, blur, and resample operation. This process generates an overlay image with values intermediate between 0 and 1. These intermediate values may be used as weights to define the relative weights of the first and second balance transforms, 34 in FIG. 2. Again in the preferred embodiment, the degree of blur may be selected by an operator using a GUI similar to that shown in FIG. 7 except the threshold slider 92 is replaced by a degree of blur slider, and the effect of the blur on the mask is displayed on a video display 86. This is very effective in filtering out small areas of confounding reflectances within an area of the image which was exposed with a single (or restricted range) of illumination. It may also be effective in defining a gradient for the balance transform in images which exhibit a brightness gradient. It has been found that the greater the difference between the levels of illumination in the different areas in the image, the less the mask needs to be blurred.

Figure 10:
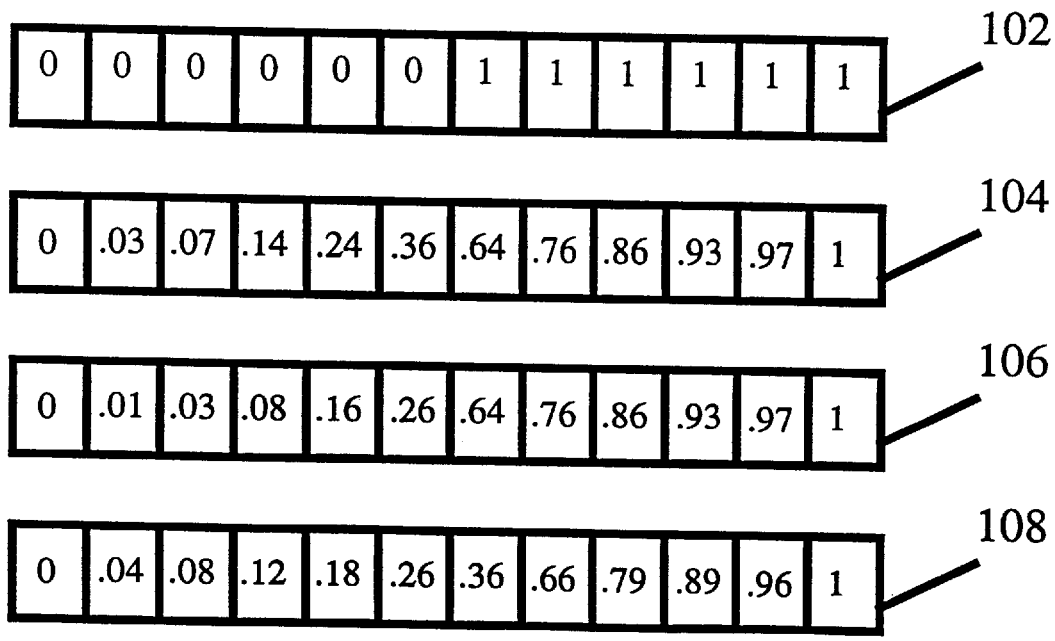
FIG. 10 is a set of tables showing a portion of the brightness range mask at various stages of modification according to the present invention.
Figure 12:
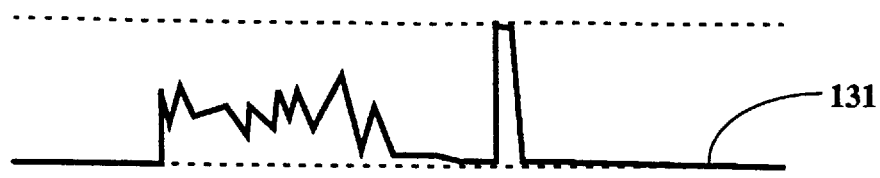
FIGS. 12–18 are diagrams useful in describing the steps of one method of the mask modification process according to the present invention.
Figure 13:
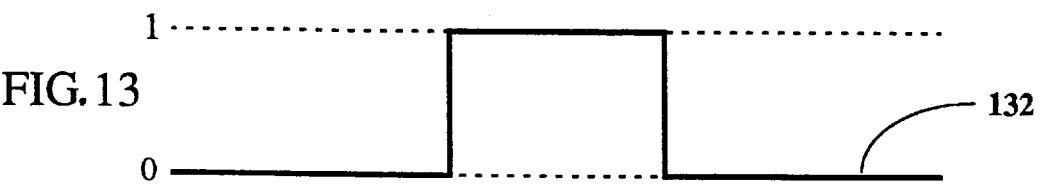
Figure 14:
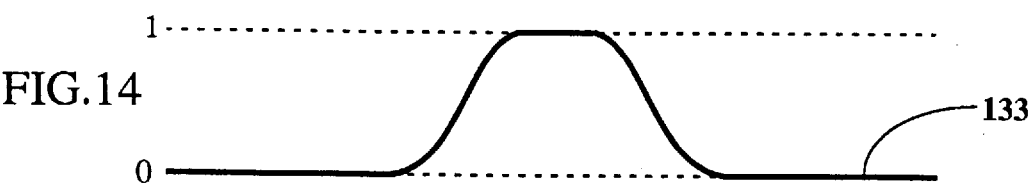

Yet another additional operation is to use a look-up table (LUT) to modify the values in the mask. FIG. 10 illustrates this LUT operation. Array 102 shows a section of one row of pixels in the mask at a boundary between the highlight region (coded as 1's) and the shadow region (coded as 0's) before blurring. Array 104 shows the effect of blurring on the mask values. Because the preferred filter is symmetric, the gradient in the filtered mask is symmetric with respect to the location of the original boundary. The particular gradient shown is for illustration purposes only. Array 106 illustrates the effect of putting the mask image through a LUT which was designed to increase the gradient for any mask values near to but below 0.50. The particular increase shown is for illustration purposes only. It is obvious to any one skilled in the use of LUT's that the gradient for any range of mask values could be modified to increase or decrease the local gradient for that range of mask values. The example shown in 106 would produce a more abrupt transition from the shadow region balance transform to the highlight region balance transform in the shadow region only. As illustrated in array 108 a LUT may also be used to shift the location of any value in the range of the mask. It shows that the mask values illustrated in array 104 have been moved to the right one pixel location with corresponding changes in the gradients involved. The use of a LUT to modify the mask permits the mask gradient within a brightness range to be adjusted to accommodate a more natural looking transition at its boundary, and it allows small adjustments of the location of the boundary between the two brightness ranges.

A preferred equation for generating the mask shaping LUT is given by:

mvout=0, in the range $0 \leq mvin < 0.005$;

mvout=mvoff+(mvoff−0.002)*tanh[ssf*(mvin−0.5)]/ 0.75991, in the range $0.005 \leq mvin < 0.5$;

mvout=mvoff+(0.998−mvoff)*tanh[hsf*(mvin−0.5)]/ 0.75991, in the range $0.5 \leq mvin < 0.995$; and mvout=1, in the range $0.995 \leq mvin < 1.0$.

Where:

mvin is the mask value to be input to the LUT;

mvout is the mask value output by the LUT;

mvoff is the mask value to be output by the LUT when the input value is 0.5;

ssf is the shadow scale factor which shapes the shadow portion of the mask;

hsf is the highlight scale factor which shapes the highlight portion of the mask; and tanh is the hyperbolic tangent function.

Figure 15:
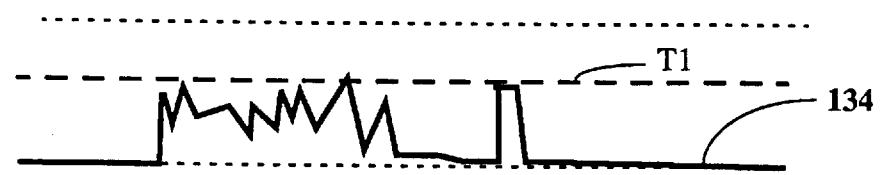
Figure 16:
Figure 17:
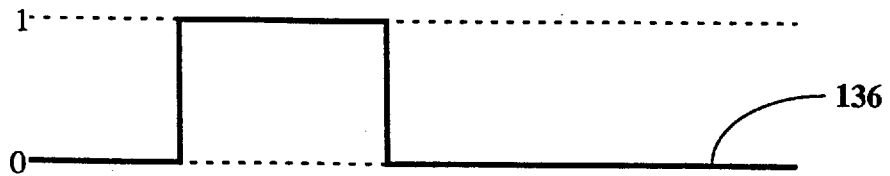
Figure 18:
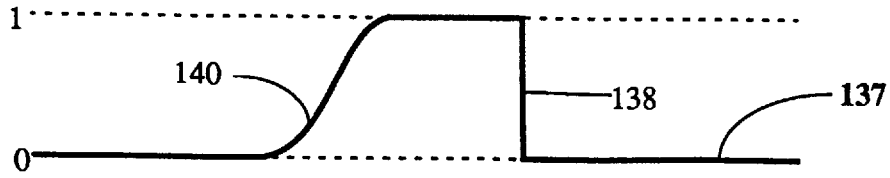

Since in some scenes certain areas require a blurred mask (generally areas of low edge activity) while other areas require a relatively sharp mask (generally areas of higher edge activity). A morphological filtering operation is illustrated in FIGS. 11–18, where one line of the image is shown for illustrative purposes, the horizontal axes representing the horizontal location in the line of an image, and the vertical axes representing the image or mask amplitudes. The morphological filtering operation may be used to combine masks with different degrees of blurring. The morphological filter operation is selected by the operator using a GUI on the computer 80. First, an edge finding filter, 130 in FIG. 11, is applied to the original scene, with the result illustrated for one line 131 of the image in FIG. 12. The sharp and blurred masks over the same region are illustrated by 132 and 133 in FIGS. 13 and 14, respectively. In FIG. 15, line 134, the edge image 131 is clipped by applying a threshold T1. The clipped image 134 is then blurred and thresholded again at a threshold T2 as illustrated in FIG. 16 by line 135. The clipped and blurred image is then normalized back to 1, resulting in the mask illustrated by line 136 in FIG. 17. To obtain the final image-wise mask, mask 136 is multiplied by imagewise mask 133 and the product is added to imagewise mask which is the result of imagewise mask 132 multiplied by (1-the mask in 136). This produces a imagewise mask 137 shown in FIG. 18 with a sharp edge 138 in one location and a blurred edge 140 in another location. This operation has proven to be useful in processing backlit scenes with natural subjects, such as trees and bushes, silhouetted against the sky.

A final step which may be performed in step 32 of FIG. 2 is a second morphological filtering operation which is useful for removing small isolated regions in the mask caused by confounding reflectances. This final step will be described with reference to FIGS. 19–24, where one line of the image is shown for illustrative purposes, the horizontal axes representing the horizontal location in the line of an image, and the vertical axes representing the mask amplitudes. A mask 120 is shown in FIG. 19 with an unwanted area 142 in the highlight region due to confounding reflectances. This mask 120 is saved, as the corrected mask will later be made directly from it. In order to remove the unwanted portion of the mask, the following procedure is used. As illustrated in FIG. 20, the mask 120 is blurred with a symmetric FIR filter, resulting in blurred mask 121, until the region of confounding reflectance has dropped below the upper limit indicated by a threshold T3. The threshold T3 is set to clip off the confounding reflectance. The result of clipping at the threshold is shown as mask 122 in FIG. 21. Next, this mask 122 is blurred resulting in blurred mask 123 in FIG. 22. The blurred mask is thresholded again (T4 in FIG. 22), which results in mask 124 shown in FIG. 23. Threshold T4 is set low enough so that the high (logic 1) portion of mask 124 in FIG. 23 is extended beyond the edge of that portion of the original mask 120 in FIG. 19 that is to be retained. The corrected mask 125 in FIG. 24 is obtained by multiplying (logic AND) mask 124 in FIG. 23 with the original mask 120 in FIG. 19. The final mask 125 in FIG. 24 compared to the original mask 120 in FIG. 19 is unchanged except for the isolated small highlight region, unwanted area 142, which has been removed. The amount of blurring and the placement of the thresholds, T3 and T4, determine the size of the isolated area, 142, that will be removed. A symmetrical operation may be performed to remove isolated shadow regions.

Returning to FIG. 2, after the mask is generated in step 32, the first and second balance transforms are applied to the first and second regions respectively in 34. This can result in the final image 36 processed by Area Selective Exposure Adjustment. However, a final optional operation 35 which an operator may apply is often advantageous. This operation increases the difference between the balance of the two regions. This may be done by moving the balance of the less important region of the image further away from the balance of the more important region, or the balance transform of both regions 1 and 2 may be slightly compromised to eliminate any remaining unacceptable artifacts in the image. Often this results in a more natural looking image anyway, since the observer of the print does remember a certain degree of difference in the illumination in the original scene even though they can't remember exactly how great the difference was. The operator may make these final adjustments to the balance transform using GUI similar to the one shown in FIG. 5 except that the threshold adjustment is replaced by individual image balance adjustments for the separate portions of the image defined by the mask, as well as an adjustment to the balance transform of the entire image. This operation is advantageous because exposure determination algorithms do not always produce the optimum balance for a given image or portion thereof. Furthermore, the final mask may change the perceived balance of the principal subject necessitating a slight balance readjustment.

Figure 25:
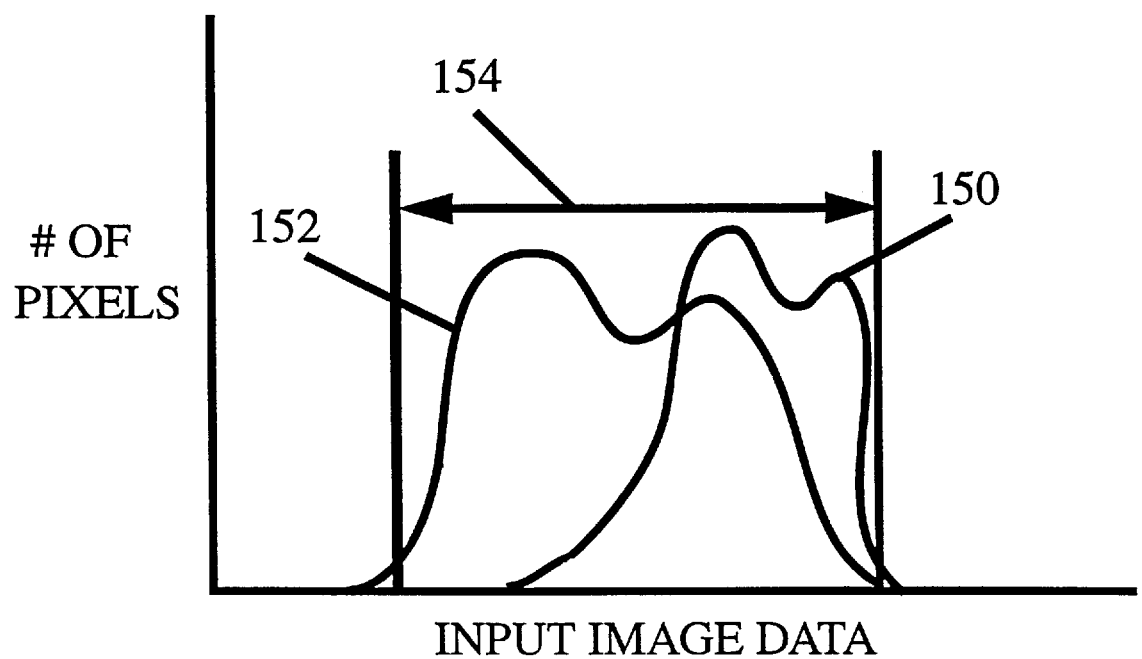
FIG. 25 is a histogram of an image after it has been modified by the method of Area Selective Exposure Adjustment according to the present invention.

FIG. 25 shows how the portions of the histogram 37 of FIG. 4 of the original image are redistributed as a result of the application of Area Selective Exposure Adjustment according to the present invention to the image data. It shows that both the highlight region 150 of the image and the shadow region 152 of the image are reproduced with their natural or intended contrast and yet they also both fall within the dynamic range 154 of the output medium.

As with any imaging system, the processed image, 36 in FIG. 2, must be rendered by an output device as shown in 10 of FIG. 1. It is rendered to the output medium in the same manner as an image which was unaffected by ASEA would be. For instance in rendering a print from a scanned negative, after the original scanned image is balanced, it is put through a series of color correction matrices and LUT's which define the color gamut and tone scale of the rendered image. Finally it is adjusted by a hardware calibration matrix and/or LUT and the resulting image file is sent to the printer hardware for printing. It is also conventional to utilize 3D LUT's in place of the series of matrices and LUT's for this rendering and calibration operation. Any conventional technique known to those skilled in the art may be used to render and produce output images from image data corrected by ASEA according to the present invention.

The invention has been described with reference to a preferred embodiment. However, it will be appreciated that variations and modifications can be effected by a person of ordinary skill in the art without departing from the scope of the invention.

| PARTS LIST |
| --- |
| 2 digital image source |
| 4 computer |
| 6 keyboard |
| 8 mouse |
| 10 output device |
| 18 image data |
| 20 form histogram step |
| 22 compare range step |
| 24 wait for next image step |
| 26 divide image into two ranges step |
| 28 determine balance transform for first range step |
| 30 determine balance for second range step |
| 32 threshold image step |
| 34 apply weighted amounts of first and second transforms step |
| 35 apply optional adjustment step |

-continued

PARTS LIST

| | |
|---|---|
| 36 | processed image |
| 37 | image histogram |
| 38 | dynamic range of output medium |
| 39 | dynamic range of output medium |
| 40 | dynamic range of output medium |
| 41 | original image data |
| 42 | replace pixels outside first range with average step |
| 44 | amended image data referenced to range 1 |
| 46 | calculate exposure determination step |
| 48 | balance transform for range 1 |
| 52 | replace pixels outside second range with average step |
| 54 | amended image data referenced to range 2 |
| 56 | balance transform for range 2 |
| 60 | original image data |
| 62 | define pixels inside and outside of first range step |
| 64 | modify pixels outside first range with difference of average step |
| 66 | amended image data referenced to range 1 |
| 68 | calculate exposure determination step |
| 70 | balance transform for range 1 |
| 72 | define pixels inside and outside of second range step |
| 74 | modify pixels outside second range with difference of average step |
| 76 | amended image data referenced to range 2 |
| 78 | balance transform for range 2 |
| 80 | workstation |
| 82 | keyboard |
| 84 | mouse |
| 86 | video monitor |
| 88 | image inside mask |
| 90 | mask boundary |
| 91 | image outside mask |
| 92 | graphic user interface (GUI) |
| 94 | shadow mask region |
| 96 | highlight mask region |
| 98 | defined area |
| 100 | shadow mask region converted to highlight mask region |
| 101 | blurring kernel |
| 102 | linear section of mask prior to blurring |
| 104 | linear section of mask after blurring |
| 106 | blurred mask after modification by LUT |
| 108 | blurred mask shifted by LUT |
| 120 | linear section of mask prior to blurring |
| 121 | linear section of mask after blurring |
| 122 | linear section of blurred and thresholded mask |
| 123 | linear section of multiply blurred and thresholded mask |
| 124 | linear section of multiply blurred and multiply thresholded mask |
| 125 | linear section of resultant mask |
| 130 | edge defining kernel |
| 131 | linear section of edge filtered image |
| 132 | linear section of sharp edged mask |
| 133 | linear section of blurred edge mask |
| 134 | linear section of thresholded edge filtered image |
| 135 | linear section of blurred, thresholded edge filtered image |
| 136 | linear section of thresholded, blurred, thresholded edge filtered image |
| 137 | linear section of combination sharp and blurred edged mask |
| 138 | sharp edge of mask |
| 140 | blurred edge of mask |
| 142 | unwanted area of confounding reflectance |
| 150 | highlight region of image histogram |
| 152 | shadow region of image histogram |
| 154 | dynamic range of output medium |

We claim:

1. A method for processing a digital image having a dynamic range representing a brightness in an original scene greater than the dynamic range of an output medium, comprising the steps of:

a) dividing the image into first and second portions, the first portion of the image representing a brightness range extending from a minimum brightness up to a distance equal to the dynamic range of the output medium, the second portion of the image representing a brightness range extending from a maximum brightness down to a distance equal to the dynamic range of the output medium;

b) determining first and second transformations for the first and second portions of the image respectively that map the first and second portions onto the dynamic range of the output medium using an exposure determination algorithm;

c) thresholding the digital image at a brightness level that divides the image into a first region having the lowest levels of brightness and a second region having the highest levels of brightness; and d) applying the first transformation to the first region of the image and the second transformation to the second region of the image.

2. The method claimed in claim 1, wherein the determining step comprises the steps of:

a) computing the average of the image values in the first portion of the image, b) substituting that average value computed in step a) for each image value in the portion of the image outside of the first portion of the image, before using the exposure determination algorithm to compute the first transform;

c) computing the average of the image values in the second portion of the image;

d) substituting that average value computed in step c) for each image value in the portion of the image outside of the second portion of the image, before using the exposure determination algorithm to compute the second transform.

3. The method claimed in claim 1, wherein the determining step comprises the steps of:

a) computing a first average of the image values in the first portion of the image and a second average of the image values in the portion of the image not in the first portion;

b) computing the difference between the first and second averages;

c) before using the exposure determination algorithm to compute the first transform, subtracting the absolute value of the difference computed in step b) from the image values in the portion of the image not in the first portion;

d) computing a third average of the image values in the second portion of the image and a fourth average of the image values in the portion of the image not in the second portion;

e) computing the difference between the third and fourth averages;

f) before using the exposure determination algorithm to compute the second transform, adding the absolute value of the difference computed in step e) to the image values in the portion of the image not in the second portion.

4. The method claimed in claim 1, wherein the thresholding step comprises the steps of:

a) defining rectangular areas in the image which are forced to be in the first region irrespective of the threshold for the brightness value being used;

b) defining rectangular areas in the image which are forced to be in the second region irrespective of the threshold for the brightness value being used.

5. The method claimed in claim 4, wherein the location of the rectangular regions are selected by an operator using a computer monitor to view the location of the region in the image and using a computer graphical user interface (GUI) to place the rectangle in the image (click-pull to opposite corner-click).

6. The method claimed in claim 1, wherein the step of thresholding the image at a brightness level is performed by an operator.

7. The method claimed in claim 6, wherein the operator adjusts the brightness threshold value using a computer graphical user interface (GUI) such as a slider bar while viewing the location in the image of the brightness threshold value by means of a computer monitor.

8. The method claimed in claim 1, wherein the first and second brightness regions are defined by an imagewise mask with values 0 in the first region and 1 in the second region.

9. The method claimed in claim 8, further comprising the step of blurring the image wise mask with a symmetric finite impulse response filter (FIR).

10. The method claimed in claim 9, further comprising the step of changing the gradient of the blurred region of the imagewise mask using a look-up table (LUT).

11. The method claimed in claim 10, wherein an operator adjusts the degree of blur and gradient adjustment using a computer graphical user interface (GUI) such as a slider bar while viewing the effect of the blur and gradient adjustment on the image wise mask by means of a computer monitor.

12. The method claimed in claim 8, further comprising the steps of:
   a) filtering the image with an edge finding filter to form an edge image;
   b) blurring and thresholding the edge image to define regions of high and low edge activity; and
   c) using these regions of edge activity to define areas for different levels of blurring of the image wise mask.

13. The method claimed in claim 12, wherein an operator adjusts the different levels of blurring of the image wise mask using a computer graphical user interface (GUI) such as a slider bar while viewing the effect of the blur on the mask by means of a computer monitor.

14. The method claimed in claim 8, further comprising the steps of:
   blurring, thresholding, and reblurring the image wise mask to create a second spatial mask, and multiplying the image wise mask by the second spatial mask to eliminate small isolated regions in the image wise mask which have the opposite value from the mask value in the regions surrounding them.

15. The method claimed in claim 14, wherein an operator adjusts the different levels of blurring, thresholding, and reblurring of the image wise mask using a computer graphical user interface (GUI) such as a slider bar while viewing the effect of the blurring and thresholding on the mask by means of a computer monitor.

16. The method claimed in claim 1, further comprising the step of adjusting the first and second transforms to produce an output image which looks more like an output image resulting from a single transform of the digital image having a dynamic range representing a brightness in the original scene greater than the dynamic range of the output medium.

17. The method claimed in claim 16, including the step of adjusting the first and second transforms using a computer graphical user interface (GUI) such as a slider bar while viewing the transformed image by means of a computer monitor.

* * * * *